J. C. TENNENT.
TOBACCO AND CABBAGE PLANTERS.

No. 193,734. Patented July 31, 1877.

WITNESSES:
A. W. Almquist
Alfred Lurcott

INVENTOR:
J. C. Tennent,
BY
ATTORNEYS.

UNITED STATES PATENT OFFICE.

JOHN C. TENNENT, OF AQUASCO P. O., MARYLAND.

IMPROVEMENT IN TOBACCO AND CABBAGE PLANTERS.

Specification forming part of Letters Patent No. 193,734, dated July 31, 1877; application filed April 30, 1875.

*To all whom it may concern:*

Figure 1:
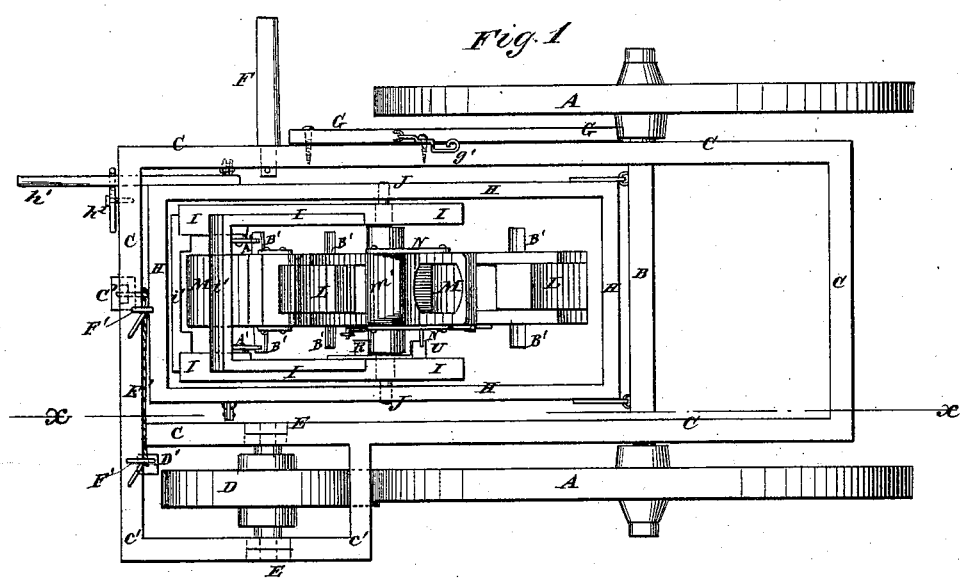
Figure 2:
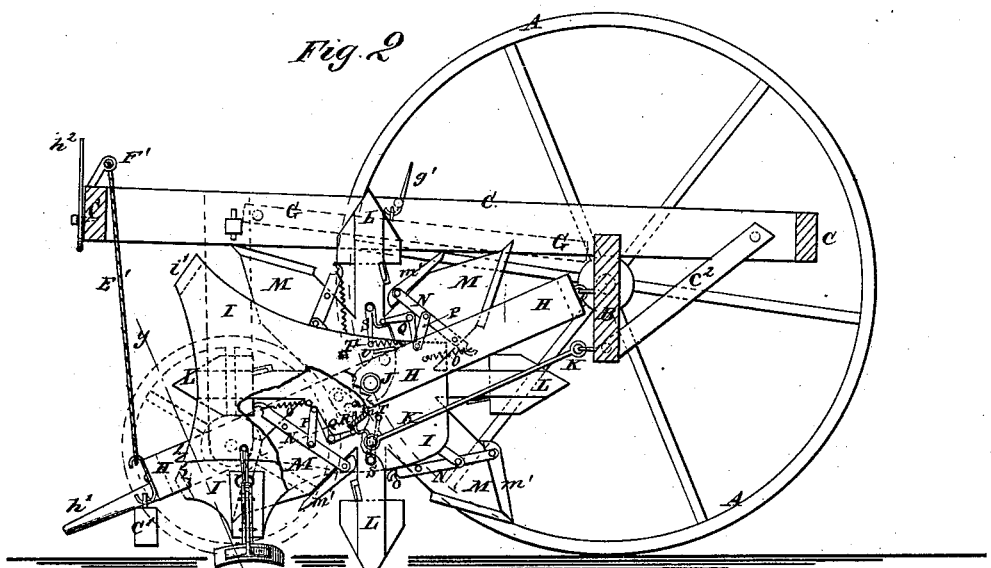
Figures 3, 4:
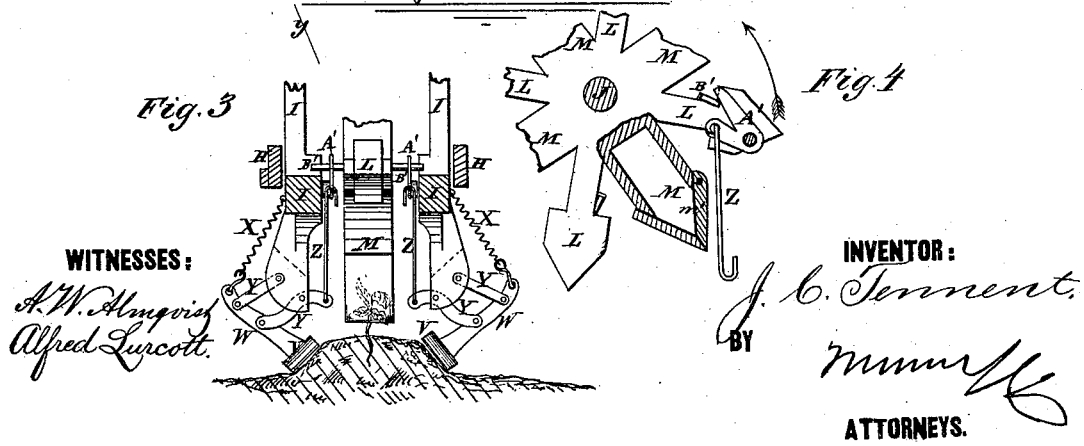

Be it known that I, JOHN COURTOIS TENNENT, of Aquasco P. O., county of Prince George, and State of Maryland, have invented a new and useful Improvement in Tobacco and Cabbage Planter, of which the following is a specification:

Figure 1 is a top view of my improved machine. Fig. 2 is a vertical longitudinal section of the same taken through the line $x\,x$, Fig. 1, and part being broken away to show the construction. Fig. 3 is a detail sectional view, taken through the line $y\,y$, Fig. 2, showing the device for pressing the soil around the roots of the plants. Fig. 4 is a detail view of the device for operating the soil-presser, one of the hollow arms being shown in section.

Similar letters of reference indicate corresponding parts.

The invention will first be described in connection with the drawing, and then pointed out in the claims.

In the drawing, A are the wheels, which revolve upon the journals of the axle B. C is a frame, which is attached, toward its forward end, to the axle B, the connection being strengthened by the braces $c^2$. The off rear corner of the frame C is supported by a wheel, D, which is pivoted to and between the lower ends of the hangers E. The upper end of the inner hanger E is attached to the rear part of the side bar of the frame C, and the upper end of the outer hanger E is attached to a lateral extension, $c^1$, of said frame C. To the near rear corner of the frame C is attached a handle, F, by which the operator supports said corner when the machine is at work.

G is a leg, pivoted to the rear part of the near side bar of the frame C, and which is turned down to support the corner of the frame C when the machine is standing still. When the machine is at work the leg G is turned up along the side of the said side bar, and is supported by a hook, $g'$, pivoted to said side bar.

H is a frame, of such a size as to fit into the space of the part of the frame C in the rear of the axle B, and which is hinged at its forward end to the said axle B.

I I are two parallel plates, which are pivoted toward their forward parts to the side bars of the frame H by the shaft J. The rear ends of the plates I are made the wider; and are connected in their upper and lower parts by cross-bars $i$.

K K are two rods or bars, the forward ends of which are pivoted to the axle B at a little distance below the hinges of the frame H. The rear ends of the rods K are pivoted to the plates I at points at the same distance from the axle B as the shaft J, and at the same distance below the said shaft J as the forward ends of the said rods K are below the hinges of the frame H.

To the shaft J, between the plates I, is pivoted a wheel, formed of four solid arms, L, and four hollow arms, M, alternating with each other, and the outer ends of all of which are made wedge-shaped. The solid arms L are simply designed to keep the wheel revolving by coming in contact with the ground.

The hollow arms M are designed to receive the plants, carry them to the ground, open holes in the ground, and drop the plants into them. To enable the arms M to do this the plates $m'$ that form the rear face of their wedge-shaped ends are made loose, and to their side edges, near their inner ends, are pivoted the ends of two bars, N. The bars N cross the arms M, and are pivoted to them near their forward edges and at a little distance from the inner ends of the forward inclines of their ends.

The forward ends of one or both of the bars N project and have rubber or metal springs O, connected with them, which are also connected with the arms M in such positions as to hold the valves or plates $m'$ closed.

To the middle part of the bars N is pivoted the end of a short connecting-bar, P, the other end of which is pivoted to the outer end of a bent lever, Q.

The lever Q is pivoted at its angle to the arm M, and the end of its other arm is bent outward or has a pin attached to it, which, as the wheel L M revolves, strikes against a stop, R, attached to the plate I, to turn the lever Q and draw back or open the valves $m'$.

As the free end of the lever Q is pushed back by the stop R it strikes against the bar S, pushes it back and passes its shoulder, by which it is caught and held.

The bar S is pivoted at its forward end to the arm M, and is held forward by a rubber or metal spring, T, attached to its inner end and to the arm M.

The inner end of the catch-bar S is turned outward, or has a pin attached to it, to strike against a stop, U, attached to the plate I, to push back the said bar S and release the lever Q, to allow the valves $m'$ to be closed by the spring O.

The stops R and U are so placed as to close each valve $m'$ when its arm M is upon the upper side of the wheel and just beginning to descend, and to open each valve $m'$ as its arm M begins to rise after forming the hole in the soil, so as to leave the plant in said hole.

The plants are inserted roots outward in the hollow arms M, while said arms are upon the upper side of the wheel, and before the valves $m'$ have been closed.

The plates I and wheel L M are made to move up and down vertically while adjusting themselves to uneven ground, by the peculiar arrangement of the bars K in connection with the hinge of the frame H and the shaft J, upon which the plates I and wheel L M are hung.

The soil is pressed in around the roots of the plants by the plates V, which are attached to the lower ends of the standards W.

The pressers V W are drawn back and held raised by the rubber or metal springs X, attached to the rear ends of the standards W and to the plates I.

The standards W are pivoted to the outer ends of two short parallel bars, Y, the inner ends of which are pivoted to the lower rear corners of the plates I.

The two bars Y, in connection with the standard W and plate I, cause the presser-plates V to move forward and back in straight lines.

The inner end of the lower bar Y projects, and to it is pivoted the lower end of the connecting-rod Z, the upper end of which is pivoted to the end of the lower arm of the bent levers A'.

The bent levers A' are pivoted at their angle to the plate I, and their upper arms project so as to be struck by the stops B' attached to the solid arms L of the wheel L M in such positions as to operate the levers A' and force the pressers V W forward at the proper time, to press the soil around the roots of the plants.

The arms M of the wheel L M are forced into the soil to form holes to receive the plants by the weight of the wheel L M, the plates I, and the frame H, and this weight is increased when necessary by suspending a weight, C', from the rear end of the frame H, and is lessened when necessary by the balance-weight D', attached to the end of a cord, E', which passes over guides or guide-pulleys F', attached to the rear end of the frame C, and its other end is attached to the rear end of the frame H.

The frame H, plates I, and wheel L M are raised from the ground, when desired, by the handle $h^1$, attached to the rear near corner of the frame H, and are held suspended for convenience in turning around and passing from place to place by hooking the handle $h^1$ upon a hook, $h^2$, attached to the rear near corner of the frame C.

As herein described, the planting-wheel is revolved by contact with the ground; but it may be revolved from the axle by means of bands and pulleys or other gearing.

Having thus fully described my invention, I claim as new and desire to secure by Letters Patent—

1. The combination of the stationary frame C, the hinged frame H, the plates I, the shaft J, and the pivoted parallel bars K, with each other and the wheels and axle A B, to form a frame-work adapted to receive the operating parts of the machine, substantially as herein shown and described.

2. The wheel, formed of alternate solid and hollow arms L M, having their outer ends made wedge-shaped, and the inclined rear side $m'$ of the ends of the hollow arms M made loose, to slide as a valve, in combination with the plates I, the hinged frame H, and bars K of the frame-work, substantially as herein shown and described.

3. The combination of the pivoted bars N, the springs O, the short connecting-bars P, the bent levers Q, the pivoted catch-bars S, the springs T, and the stops R U, with the wheel L M, the sliding plates $m'$, and the plates I of the frame-work, for opening and closing the hollow arms M of the said wheel L M automatically, as the machine is drawn forward, substantially as herein shown and described.

4. The combination of the presser-plates V, the standards W, the springs X, the pairs of parallel connecting-bars Y, the connecting-rods Z, the bent levers A', and the stops B', with the plates I of the frame-work, and with the wheel L M, substantially as herein shown and described.

JOHN C. TENNENT.

Witnesses:
JAMES T. GRAHAM,
C. SEDGWICK.